(12) United States Patent
Viault et al.

(10) Patent No.: US 10,113,449 B2
(45) Date of Patent: Oct. 30, 2018

(54) CAM FOLLOWER ROLLER DEVICE WITH INSERT

(71) Applicants: Samuel Viault, Saint-Antoine-du-Rocher (FR); Benoît Hauvespre, Saint Etienne de Chigny (FR); Thomas Perrotin, Saint Roch (FR)

(72) Inventors: Samuel Viault, Saint-Antoine-du-Rocher (FR); Benoît Hauvespre, Saint Etienne de Chigny (FR); Thomas Perrotin, Saint Roch (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/298,662

(22) Filed: Oct. 20, 2016

(65) Prior Publication Data

US 2017/0130616 A1    May 11, 2017

(30) Foreign Application Priority Data

Nov. 5, 2015 (EP) ..................................... 15306752

(51) Int. Cl.
 *F01L 1/14* (2006.01)
 *F02M 59/10* (2006.01)
 *F16H 53/06* (2006.01)

(52) U.S. Cl.
 CPC ............. *F01L 1/14* (2013.01); *F02M 59/102* (2013.01); *F16H 53/06* (2013.01); *F01L 2105/00* (2013.01)

(58) Field of Classification Search
 CPC ...... F01L 1/14; F01L 2105/00; F02M 59/102; F16H 53/06
 See application file for complete search history.

(56) References Cited

U.S. PATENT DOCUMENTS

| 3,628,514 | A | 12/1971 | Phillips | |
|---|---|---|---|---|
| 7,793,583 | B2* | 9/2010 | Radinger | F01L 1/143 74/569 |
| 2016/0160986 | A1* | 6/2016 | Berruet | F02M 59/102 74/569 |
| 2017/0145869 | A1* | 5/2017 | Corbett | F01L 1/14 |

FOREIGN PATENT DOCUMENTS

| DE | 102005040219 A1 | 3/2007 |
|---|---|---|
| DE | 102012221604 A1 | 5/2014 |
| EP | 2853738 A1 | 4/2015 |
| WO | 0220953 A1 | 3/2002 |
| WO | 2008068116 A1 | 6/2008 |

\* cited by examiner

*Primary Examiner* — Vicky A Johnson
(74) *Attorney, Agent, or Firm* — Bryan Peckjian; SKF USA Inc. Patent Dept.

(57) ABSTRACT

The cam follower roller device provides a tappet body 12, an insert 18 mounted in the tappet body and provided with a central core 24 and with at least two side tabs 26, 28, a pin 14 mounted at least on the tabs of the insert, and a roller 16 mounted on the pin. The insert 18 further provides at least one stiffener 44, 46 disposed between the core 24 and each tab 26, 28.

19 Claims, 3 Drawing Sheets

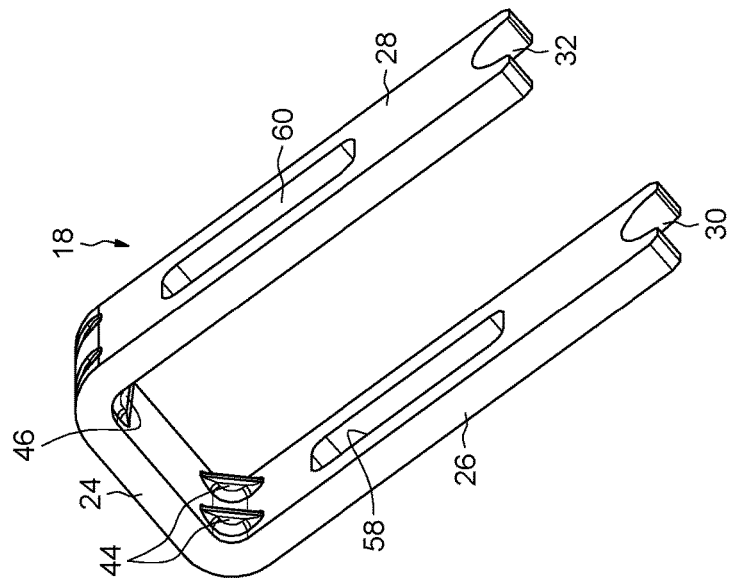
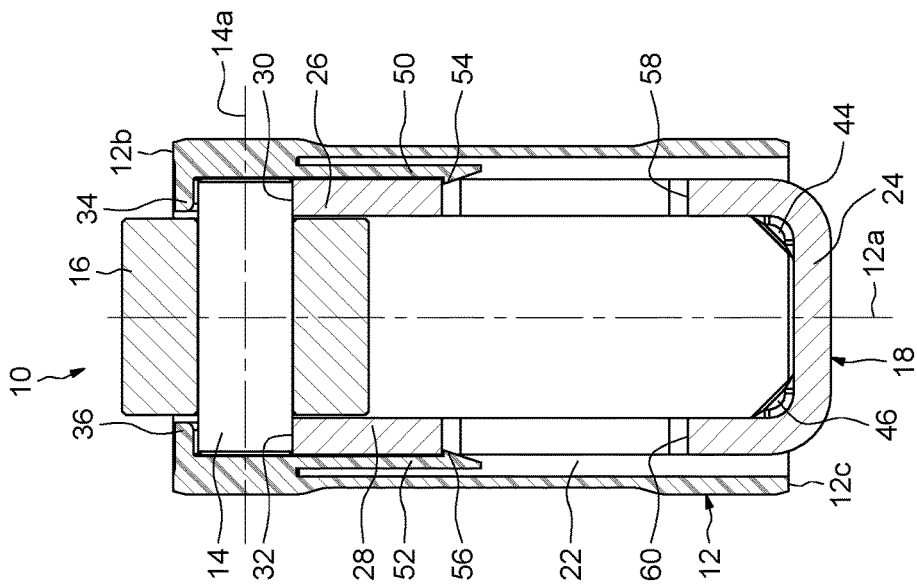

CAM FOLLOWER ROLLER DEVICE WITH INSERT

CROSS REFERENCE TO RELATED APPLICATIONS

This application claims priority to European patent application no. 15306752.5 filed on Nov. 5, 2015, the contents of which are fully incorporated herein by reference.

FIELD OF THE INVENTION

The present invention relates to the field of cam follower roller devices used in automotive or industrial applications. One advantageous application of the invention is the use of the cam follower roller device in a fuel injection pump intended for an internal combustion engine, in particular of a motor vehicle. Another advantageous application of the invention is the use of the device in a rocker system intended for controlling valves of an internal combustion piston engine.

BACKGROUND OF THE INVENTION

Such a cam follower roller device generally provides an outer tappet body, a pin mounted on the tappet body and a roller movable in rotation relative to the pin around its axis. When the cam follower roller device is in service in a fuel injection pump, the roller collaborates with a cam synchronized with the internal combustion engine camshaft or crankshaft. The rotation of the camshaft, or crankshaft, leads to a periodic displacement of a piston of the pump that rests against the tappet body, to allow fuel to be delivered.

It is also known to provide the cam follower roller device with an insert as a stroke-transmission part mounted in the tappet body. EP-A1-2 853 738 describes a device comprising such an insert supporting the pin while the tappet body supports the insert.

With increasing demand on fuel efficiency in order to optimize the injection inside the internal combustion engine, the pressure of the fuel pump has raised significantly last years. With a higher fuel pump pressure, the piston load applied on the insert of the cam follower roller device increases as well.

BRIEF SUMMARY OF THE INVENTION

One aim of the present invention is to provide an improved cam follower roller device having a good reliability.

In one embodiment, the cam follower roller device provides a tappet body, an insert mounted in the tappet body and provided with a central core and with at least two side tabs, a pin mounted at least on the tabs of the insert, and a roller mounted on the pin. The insert further provides at least one stiffener disposed between the core and each tab. The at least one stiffener may comprise at least one buttress, and the at least one buttress may have a first side that extends along one of the tabs, a second side that extends along the core and a free edge that extends from the one of the tabs to the core. The at least one buttress may be substantially triangular when viewed in a direction perpendicular to an axis of rotation of the roller and perpendicular to a longitudinal axis of the tappet body. Furthermore the at least two side tabs may include a first side tab having an inner surface lying in a first plane and a second side tab having an inner surface lying in a second plane, and the core may include an inner surface lying in a third plane perpendicular to the first plane. The inner surface of the first side tab and the inner surface of the second side tab and the inner surface of the core defining an interior of the insert, and the at least one buttress may be located in the interior of the insert. The buttresses on the first side tab or on the second side tab may be separated from each other by a gap.

The use of at least one stiffener provided between the core and each tab makes it possible to increase the stiffness of the insert. With each stiffener acting as reinforcing means, the deformations of the insert under the action of a piston or plunger are limited. Besides, since the insert is less subject to deformations, it is possible to foresee an insert with a reduced thickness which leads to a weight reduction of the cam follower roller device.

Preferably, each stiffener extends at least along a part of the junction between the core and the associated tab of the spacer. Each stiffener may further extend both on the core and on the associated tab of the spacer. Accordingly, the stiffness of the insert is further increased. Each stiffener may extend towards the roller.

In one embodiment, the insert and the stiffeners are made in one part. Each stiffener may be made by local plastic deformation of the insert. In one embodiment, the insert may be made of stamped metal sheet. Alternatively, the insert may be made of plastic material for example by moulding. Each stiffener may provide a rib.

Preferably, each tab of the insert provides a receiving housing into which is mounted an end of the pin. In one embodiment, the tappet body provides axial blocking means for maintaining the pin into the receiving housings.

In one embodiment, the tappet body further provides anti-rotation means provided on an inner surface of the body and cooperating with the tabs of the insert to prevent the insert from moving in the circumferential direction relative to the tappet body. The anti-rotation means may provide two pairs of two axial ribs, each tab of the insert being located circumferentially between the two ribs of one pair.

Alternatively or in combination, the tappet body may further provide at least one retaining means cooperating with the insert for axially retaining the insert relative to the tappet body. The retaining means may cooperate with one opening formed on the tabs of the insert. In one embodiment, the retaining means provide a lug radially spaced apart from an inner surface of the tappet body and provided with a hook.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which:

FIG. 5 is a cross-section of a cam follower roller device according to a second example of the invention, and FIG. 6 is a perspective view of an insert of the device of FIG. 4.

DETAILED DESCRIPTION OF THE INVENTION

Figure 2:
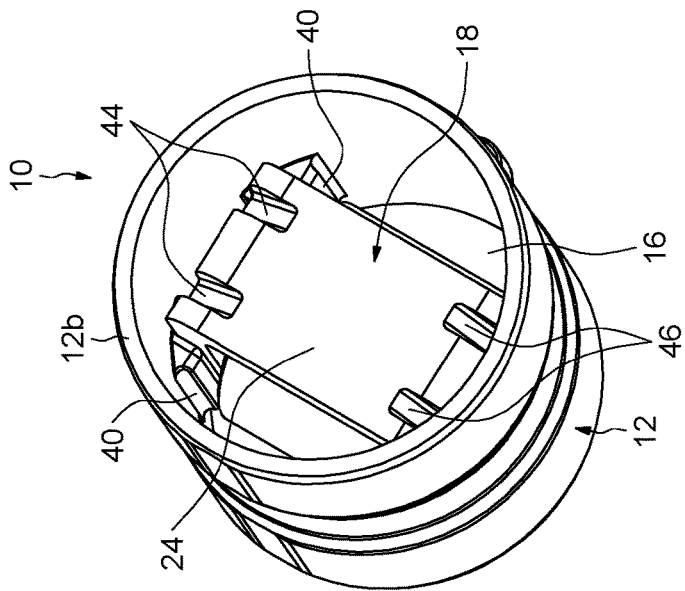
FIG. 2 is a perspective view of the device of FIG. 1, FIGS. 3 and 4 are perspective views of an insert of the device of FIG. 1.
Figure 1:
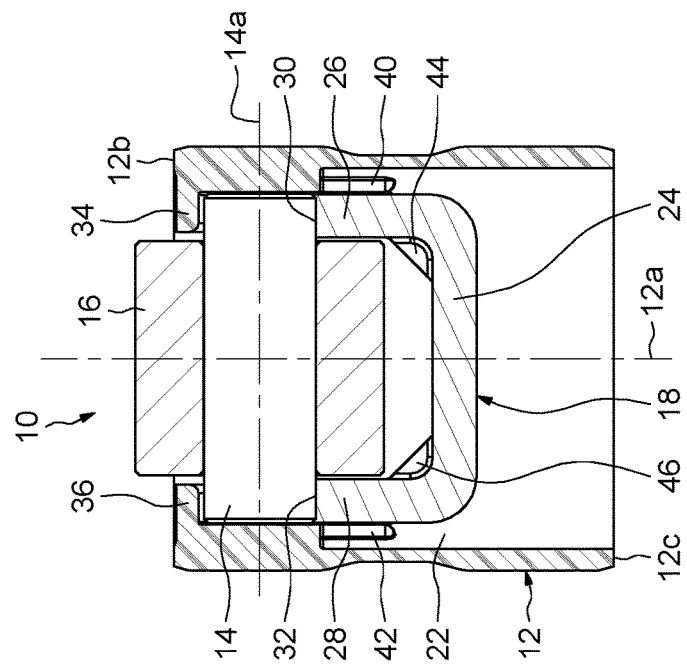
FIG. 1 is a cross-section of a cam follower roller device according to a first example of the invention.
Figure 4:
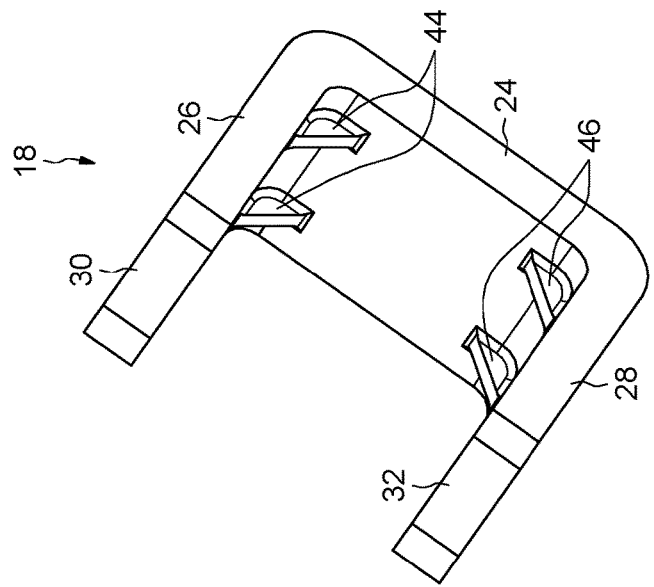
Figure 3:
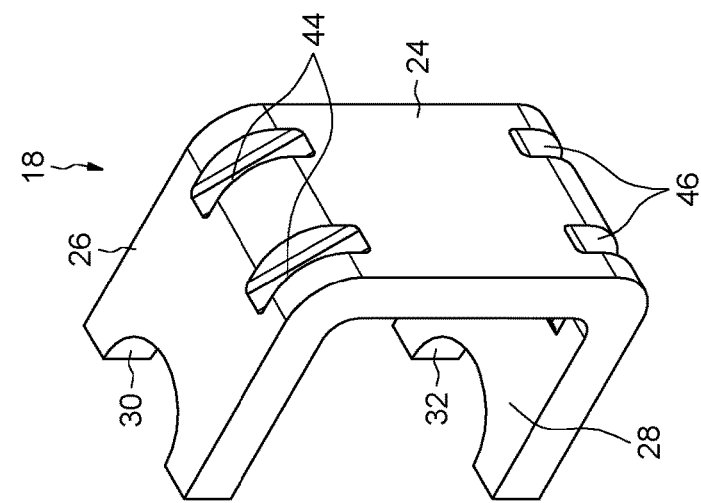

As shown on FIGS. 1 and 2, a cam follower roller device 10 provides an outer tappet housing or body 12 extending along an axis 12a, a shaft or pin 14 extending along an axis 14a perpendicular to the axis 12a, a roller 16 mounted on the pin and movable in rotation relative to the pin, and an insert 18 mounted in the tappet body. The insert 18 supports the pin 14 while the tappet body 12 supports the insert. As will be described later, the insert 18 is designed to limit the phenomena of deformation which occur with the contact against a movable element (not shown), such as a piston of a fuel injection pump.

In the disclosed embodiment, the roller 16 is directly mounted on the pin 14. Alternatively, a rolling bearing or a plain bearing may be radially interposed. The roller 16 provides a cylindrical outer surface (not referenced) which forms a contact surface intended to bear against the associated cam of the internal combustion engine.

The tappet body 12 is made in one part. In the disclosed example, the body 12 has a tubular form. The tappet body 12 provides a cylindrical axial outer surface and a cylindrical axial inner bore or surface. The inner surface delimits a cavity 22 inside which are located the insert 18 and the pin 14. The roller 16 axially protrudes outwards with respect to an upper face 12b of the tappet body 12. The tappet body 12 also provides a lower face 12c which delimits axially together with the upper face 12b the body.

The insert 18 is made in one part. The insert 18 may preferably be made of metal, by example steel, or be made of plastic material. The insert 18 is distinct from the tappet body 12. In the disclosed example, the insert 18 is entirely housed inside the cavity 22 delimited by the tappet body 12.

The insert 18 provides a base part or central core 24 and two side parts or lateral tabs 26, 28 extending from the core and facing each other. The tabs 26, 28 of the insert extend from the core 24 towards the upper face 12b of the tappet body. The insert 18 has in cross-section a U-shape. The roller 16 is disposed between the tabs 26, 28. A concave recess 30, 32 is provided at the free end of each tab to receive the pin 14. Both recesses 30, 32 extend through the tabs 26, 28 along the axis 14a and have the same diameter. Recesses 30, 32 form receiving housings adapted to receive the ends of the pin 14. Each end of the pin 14 is supported by one of the two tabs 26, 28. The pin 14 is supported by the insert 18.

The tappet body 12 further provides means 34, 36 for axially blocking the pin 14 and the roller 16 relative to the body. The axial blocking means 34, 36 block the translation of pin 14 in a direction from the lower face 12c of the tappet towards the upper face 12b. The axial blocking means 34, 36 are integrally formed with the tappet body 12. In the illustrated example, these means 34, 36 are provided on the inner surface of the tappet body at the upper face 12b. The axial blocking means 34, 36 delimit receiving housings each facing one of the receiving housings 30, 32 of the insert to delimit together cylindrical bores for the ends of the pin 14.

Alternatively, it could be possible to provide a spacer comprising cylindrical through-holes made into the thickness of the lateral tabs and facing one another, the ends of the pin 14 being fixed in the through-holes.

The tappet body 12 also provides two pairs of two axial ribs 40, 42 provided on the inner surface of the body and which radially protrude inwards. The ribs 40, respectively 42, extend axially the axial blocking means 34, respectively 36. The ribs 40 are symmetrical to the ribs 42 with respect to a transverse axial plane passing through the center of the roller 16. The ribs 40, 42 of each pair are spaced apart one relative to another to delimit a space into which is located one of the tabs 26, 28 of the insert. Accordingly, each tab 26, 28 is located circumferentially between the two ribs 40, 42 of one pair. Each tab 26, 28 abuts in the circumferential direction against one of the ribs 40, 42 of one pair on one side, and abuts against the other rib of the pair on the other side. The ribs 40, 42 cooperate with the tabs 26, 28 to prevent the insert 18 from moving in the circumferential direction relative to the tappet body 12.

As above-mentioned, the insert 18 is designed to have an increased resistance against deformation. As shown on FIGS. 1 to 4, the insert 18 provides a pair of two stiffeners 44, 46 provided between the core 24 and each tab 26, 28. Each stiffener 44, 46 extends along a part of the junction between the core 24 and the associated tab 26, 28. In the disclosed example, this junction has a curved shape. Each stiffener 44, 46 also extends on the associated tab 26, 28 and on the core 24. Each stiffener 44, 46 forms locally a protrusion or rib. Each stiffener 44, 46 extends between the core 24 and the associated tab 26, 28, and is connected to the core and tab. Each stiffener 44, 46 protrudes towards the inside of the insert 18. Each stiffener 44, 46 protrudes towards the roller 16.

In the disclosed example, each stiffener 44, 46 is made by local plastic deformation of the insert 18. Each deformation is achieved by upsetting some of the material of the insert 18 in order to cause the material to creep. The stiffeners 44, 46 are obtained by pushing. The stiffeners 44, 46 are made in one part with the insert 18. In the disclosed example, two stiffeners are provided between each tab 26, 28 and the core 24 of the insert. Alternatively, it could be possible to foresee only one or at least three stiffeners for each tab.

In the example illustrated on FIGS. 5 and 6, in which identical parts are given identical references, the tappet body 12 and the insert 18 of the cam follower device each have an increased length. The axial length of the device 10 may be adapted according to the application and the specification of the motor vehicle manufacturers. In the disclosed example, the core 24 of the insert protrudes axially outwards with respect to the lower face 12c of tappet body.

The tappet body 12 here provides lugs 50, 52 each extending axially from one of the axial blocking means towards the lower face 12c of the tappet body. Each lug 50, 52 is radially spaced apart from the inner surface of the tappet body. The lugs 50, 52 are elastically deformable in radial direction. In the disclosed example, the spacer provides two lugs. Each lug 50, 52 is provided with a hook 54, 56 in order to form axial retaining means of the insert 18 relative to the tappet body. The lugs 50, 52 enable to axially retain the insert 18. Each hook 54, 56 extends radially inwards the associated lug 50, 52. Each hook 54, 56 protrudes radially from the free end of associated lug 50, 52. Each hook 54, 56 extends radially into an opening 58, 60 formed into the thickness of one of the tabs 26, 28 of the insert. Each hook 54, 56 axially bears against an edge of the associated opening 58, 60. The lugs 50, 52 provided with the hooks 54, 56 and the body 12 are formed in one part.

In the illustrated examples, the tappet body 12 is made from synthetic material, such as polyamide for example. The tappet body 12 is advantageously formed by moulding. Alternatively, the tappet body 12 may be made of metal, for example in an economic way by cutting, stamping and folding.

The invention has been illustrated on the basis of a cam follower roller device comprising an insert provided with integrated stiffeners, i.e. which are made in one part with the insert. Alternatively, each stiffener may be a separate and distinct part from the insert which may be secured to the insert by any appropriate means.

The invention claimed is:

1. A cam follower roller device comprising:
a tappet body,
an insert mounted in the tappet body and provided with a central core and with at least two side tabs,
a pin mounted at least on the tabs of the insert,
a roller mounted on the pin, and
at least one buttress extending from the core to each tab,
wherein the at least two side tabs comprises a first side tab and a second side tab and wherein the at least one buttress comprises a first buttress and a second buttress separated from the first buttress by a first gap and wherein the first buttress and the second buttress extend from the first side tab to the core.

2. The device according to claim 1, wherein each buttress extends from the core towards the roller.

3. The device according to claim 1, wherein the insert and the buttresses are made in one part.

4. The device according to claim 1, wherein each buttress is made by local plastic deformation of the insert.

5. The device according to claim 1, wherein the insert is made of stamped metal sheet.

6. The device according to claim 1, wherein each tab of the insert comprises a receiving housing into which an end of the pin is mounted.

7. The device according to claim 6, wherein the tappet body comprises axial blocking means for maintaining the pin into the receiving housings.

8. The device according to claim 1, wherein the tappet body further comprises at least one retaining means cooperating with the insert for axially retaining the insert relative to the tappet body.

9. The device according to claim 8, wherein the retaining means of the tappet body cooperates with one opening formed on the tabs of the insert.

10. The device according to claim 1,
wherein the first buttress includes a first side extending along the first side tab and a second side extending along the core and a free edge extending from the first side tab to the core.

11. The device according to claim 10, wherein the first buttress is triangular when viewed in a direction perpendicular to an axis of rotation of the roller and perpendicular to a longitudinal axis of the tappet body.

12. The device according to claim 1,
wherein the first side tab has an inner surface lying in a first plane and the second side tab has an inner surface lying in a second plane,
wherein the core includes an inner surface lying in a third plane perpendicular to the first plane, the inner surface of the first side tab and the inner surface of the second side tab and the inner surface of the core defining an interior of the insert, and
wherein the first buttress and the second buttress are located in the interior of the insert.

13. The device according to claim 1, wherein the at least one buttress comprises a third buttress extending from the second side tab to the core.

14. The device according to claim 13, wherein the at least one buttress includes a fourth buttress extending from the second side tab to the core, the fourth buttress being separated from the third buttress by a second gap.

15. A cam follower roller device comprising:
a tappet body,
an insert mounted in the tappet body and provided with a central core and with at least two side tabs,
a pin mounted at least on the tabs of the insert,
a roller mounted on the pin, and
at least one stiffener disposed between the core and each tab,
wherein the tappet body further comprises at least one retaining means cooperating with the insert for axially retaining the insert relative to the tappet body, and
wherein the retaining means comprises a lug radially spaced apart from an inner surface of the tappet body and provided with a hook.

16. The device according to claim 15, wherein the at least one stiffener comprises at least one buttress.

17. A cam follower roller device comprising:
a tappet body,
an insert mounted in the tappet body and provided with a central core and with at least two side tabs,
a pin mounted at least on the tabs of the insert,
a roller mounted on the pin, and
at least one stiffener disposed between the core and each tab,
wherein the tappet body further comprises anti-rotation means provided on an inner surface of the body and cooperating with the tabs of the insert to prevent the insert from moving in the circumferential direction.

18. The device according to claim 17, wherein the at least one stiffener comprises at least one buttress.

19. The device according to claim 17, wherein the anti-rotation means comprises two pairs of two axial ribs, each tab of the insert being located circumferentially between the two ribs of one pair.

* * * * *